(12) United States Patent
Fong et al.

(10) Patent No.: US 11,699,886 B2
(45) Date of Patent: Jul. 11, 2023

(54) POWER DISTRIBUTION CONNECTOR WITH INTERFACE LOAD RECEPTACLE

(71) Applicant: ABB Schweiz AG, Baden (CH)

(72) Inventors: Robert Fong, Bethlehem, PA (US); Jeffrey S. Gieger, Dingmans Ferry, PA (US)

(73) Assignee: ABB Schweiz AG, Baden (CH)

( * ) Notice: Subject to any disclaimer, the term of this patent is extended or adjusted under 35 U.S.C. 154(b) by 24 days.

(21) Appl. No.: 17/541,420

(22) Filed: Dec. 3, 2021

(65) Prior Publication Data

US 2023/0178946 A1 Jun. 8, 2023

(51) Int. Cl.
*H02B 1/20* (2006.01)
*H01R 25/00* (2006.01)
*H01R 13/53* (2006.01)

(52) U.S. Cl.
CPC ........... *H01R 25/006* (2013.01); *H01R 13/53* (2013.01); *H01R 25/003* (2013.01); *H02B 1/20* (2013.01)

(58) Field of Classification Search
CPC .... H01R 25/006; H01R 25/003; H01R 13/53; H02B 1/20
See application file for complete search history.

(56) References Cited

U.S. PATENT DOCUMENTS

| 4,776,089 | A | * | 10/1988 | Schoenwetter | ......... B25B 27/14 |
| | | | | | 439/480 |
| 5,421,750 | A | * | 6/1995 | Crotty | .................... H01R 13/53 |
| | | | | | 439/801 |
| 8,602,800 | B2 | * | 12/2013 | Borgstrom | ............. H01R 13/53 |
| | | | | | 439/181 |
| 9,112,322 | B2 | * | 8/2015 | Siebens | .................. H01R 13/17 |
| 2010/0149715 | A1 | * | 6/2010 | Yaworski | ........... H01R 13/6666 |
| | | | | | 361/127 |
| 2014/0024268 | A1 | * | 1/2014 | Mikli | ................. H01R 13/6315 |
| | | | | | 439/700 |
| 2014/0346023 | A1 | * | 11/2014 | Siebens | .................. H01R 13/53 |
| | | | | | 200/48 R |

* cited by examiner

*Primary Examiner* — Tho D Ta
(74) *Attorney, Agent, or Firm* — Leydig, Voit & Mayer, Ltd.

(57) ABSTRACT

A power distribution connector is configured to connect an electrical cable to at least three electrical interfaces. The connector includes a housing with first and second sections. The first section includes a first electrical interface disposed at a first end of the first section and a second electrical interface disposed at a second end opposite the first end. The second section forms a T-shaped intersection with the first section between the first and second electrical interfaces. The second section includes a distal end opposite the T-shaped intersection, the distal end being configured to receive the electrical cable; and a third electrical interface oriented parallel to the first section, disposed adjacent to the second electrical interface, and extending a distance from an axis of the second section that is less than or equal to a distance from the axis of the second section that the second electrical interface extends.

20 Claims, 12 Drawing Sheets

POWER DISTRIBUTION CONNECTOR WITH INTERFACE LOAD RECEPTACLE

BACKGROUND

In commercial, residential, and industrial settings, electrical power may require electrical connections to distribute the power to equipment and/or end users. These connections may need to be made in environments providing very limited space. For example, a pad transformer may receive electrical power via an electrical cable buried underground and emerging through the pad into an enclosure for the transformer. In such environments, it may be useful to tap the cable to power additional needs. However, such taps may need to operate with little or no additional space

SUMMARY

One or more embodiments of the present invention may provide a power distribution connector configured to electrically connect an electrical cable to at least three electrical interfaces. The power distribution connector may include: a housing, including: a first section, including: a first electrical interface including a first tapered bore and disposed at a first end of the first section, the first electrical interface configured to receive a first male bushing or first connecting plug, the first male bushing and the first connecting plug being electrically conductive; and a second electrical interface including a second tapered bore and disposed at a second end opposite the first end, the second electrical interface configured to receive an interface plug, wherein the interface plug mechanically and electrically secures the first male bushing or first connecting plug in the first tapered bore; and a second section that forms a T-shaped intersection with the first section between the first electrical interface and the second electrical interface, the second section including: a distal end opposite the T-shaped intersection, the distal end being configured to receive the electrical cable; and a third electrical interface including a third tapered bore and oriented parallel to the first section and disposed adjacent to the second electrical interface, the third electrical interface configured to receive and to electrically and mechanically secure a second male bushing and extending a distance from an axis of the second section that is less than or equal to a distance from the axis of the second section that the second electrical interface extends, where each tapered bore includes identical dimensions.

One or more embodiments of the present invention may provide a 600-ampere power distribution connector configured to electrically connect an electrical cable to at least three electrical interfaces. The power distribution connector may include: a housing, including: a first section, including: a first electrical interface including a first tapered bore and disposed at a first end of the first section, the first electrical interface configured to receive a first 600-ampere male interface configured to Standard 386 of the Institute of Electrical and Electronics Engineers (IEEE), the first male interface being electrically conductive; and a second electrical interface including a second tapered bore and disposed at a second end opposite the first end, the second electrical interface configured to receive an interface plug, wherein the interface plug mechanically and electrically secures the first male bushing or first connecting plug in the first tapered bore; and a second section that forms a T-shaped intersection with the first section between the first electrical interface and the second electrical interface, the second section including: a distal end opposite the T-shaped intersection, the distal end being configured to receive the electrical cable; and a third electrical interface including a third tapered bore and oriented parallel to the first section and disposed adjacent to the second electrical interface, the third electrical interface configured to receive a second 600-ampere male interface configured to IEEE Standard 386 and to electrically and mechanically secure a second male bushing and extending a distance from an axis of the second section that is less than or equal to a distance from the axis of the second section that the second electrical interface extends, where each electrical interface includes identical dimensions, and where the housing further includes: an inner layer comprising a first conductive material; an outer layer including a second conductive material; and a middle layer including an insulating material that is disposed between and electrically isolates the inner layer and the outer layer.

One or more embodiments of the present invention may provide a K600 access interface load receptacle disposed in a 600-ampere deadbreak elbow connector. The connector may include: a housing, including: a first section, including: a first electrical interface including a first tapered bore and disposed at a first end of the first section, the first electrical interface configured to receive a first 600-ampere male interface configured to Standard 386 of the Institute of Electrical and Electronics Engineers (IEEE), the first male interface being electrically conductive; and a second electrical interface including a second tapered bore and disposed at a second end opposite the first end, the second electrical interface configured to receive an interface plug, where the interface plug mechanically and electrically secures the first male bushing or first connecting plug in the first tapered bore; and a second section that forms a T-shaped intersection with the first section between the first electrical interface and the second electrical interface, the second section including: a distal end opposite the T-shaped intersection, the distal end being configured to receive the electrical cable; and the K600 access interface load receptacle including a third tapered bore and oriented parallel to the first section and disposed adjacent to the second electrical interface, the K600 access interface load receptacle configured to receive a second 600-ampere male interface configured to IEEE Standard 386 and to electrically and mechanically secure a second male bushing and extending a distance from an axis of the second section that is less than or equal to a distance from the axis of the second section that the second electrical interface extends, where the first electrical interface, the second electrical interface, and the K600 access interface load receptacle, each include identical dimensions, and where the housing further includes: an inner layer including a first conductive material; an outer layer including a second conductive material; and a middle layer including an insulating material that is disposed between and electrically isolates the inner layer and the outer layer.

DETAILED DESCRIPTION

One or more embodiments of the present disclosure may provide an additional electrical interface, or receptacle, for a power distribution connector without additional space required in at least two dimensions. The power distribution connector may be used in industrial, commercial, and residential settings. For example, a transformer may be located on a pad on the ground. The transformer may receive electrical power through an underground feed. The feed may be an electrical cable that enters the transformer enclosure through the pad. The cable may electrically connect to the transformer via the power distribution connector, for example, an elbow connector. In one or more embodiments, the elbow connector may be a deadbreak elbow connector. The voltage and the current ratings may be set according to industry standards. Standard 386 of the Institute of Electrical and Electronics Engineers (IEEE) may be applied. For example, the electrical cable may be able to provide a 600 ampere (A) current with a voltage between 2.5 kilovolts (kV) and 35 kV, and more specifically, 15 kV, 25 kV, or 35 kV, though other currents and voltages may also be used. In addition to current and voltage standards, embodiments disclosed herein may comply with IEEE Standard 386 or some other standard for such things as interface design considerations such as taper and dimensions of interface bores and the like.

In addition to the power requirements of the transformer, other equipment may need electrical power. However, space within a transformer enclosure may be limited. Therefore, it may be advantageous to provide an additional electrical interface on the power distribution connector, particularly an interface that has zero additional footprint in two dimensions. For example, in the case of the transformer being fed by a cable extending vertically upward through the transformer pad, the additional interface would require no additional space in either horizontal direction.

The figures and the related following discussion are provided as non-limiting examples of power distribution connectors, electrical interfaces including a K600 access interface load receptacle, or portions thereof.

Figure 1A:
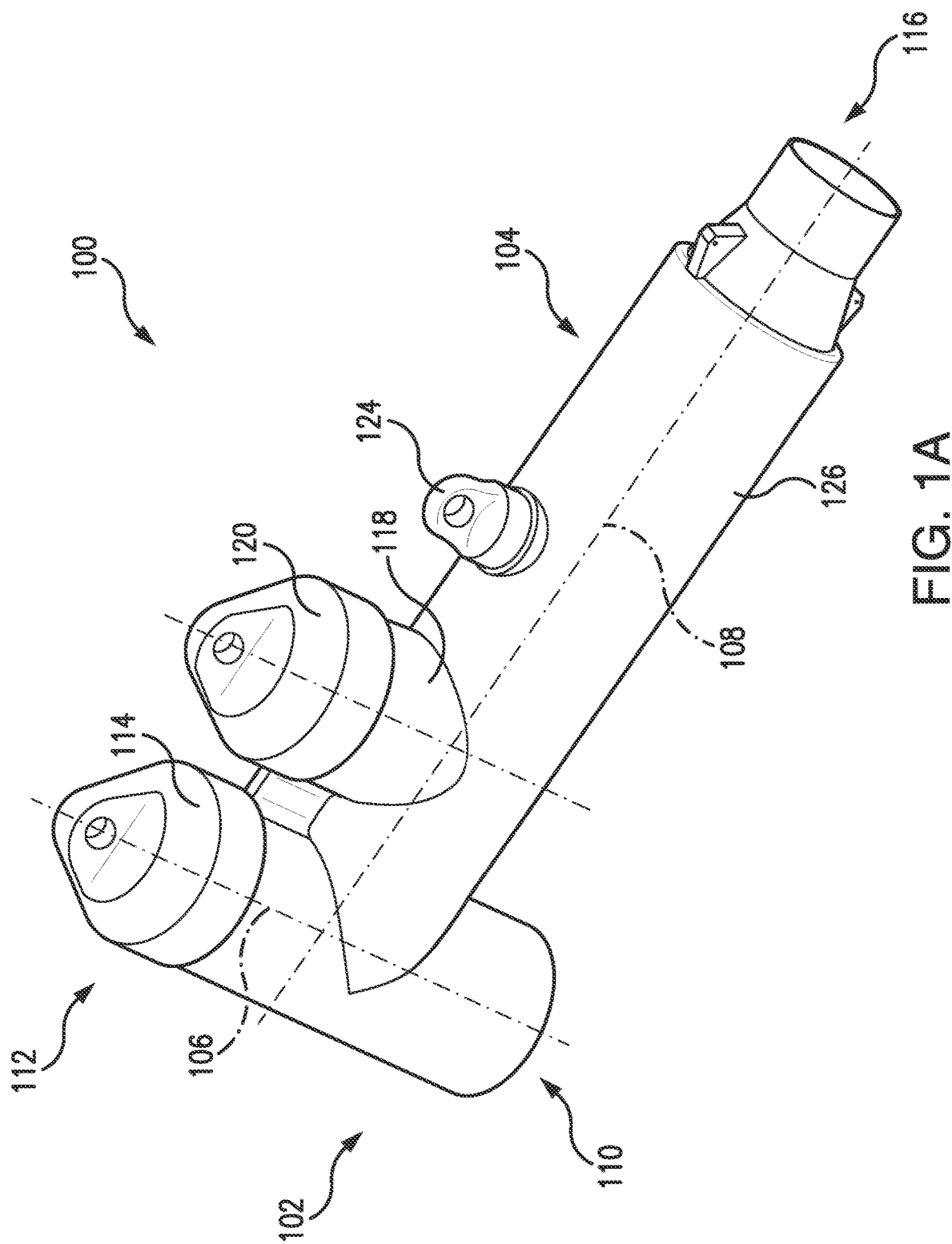
FIGS. 1A-1D show a perspective view, a cross sectional view, an end view, and a side view, respectively, of an electrical power distribution connector in accordance with one or more embodiments.

An elbow connector 100 for making electrical connections is presented in perspective view in FIG. 1A. The elbow connector may include a first section 102 and a second section 104. Both sections may be essentially cylindrical in shape, the first section 102 may have an axis 106, while the second section may have an axis 108 and one end of the second section may form a T-shaped intersection with first section. A first end 110 of the first section 102 may form a first electrical interface and be configured to electrically connect to a transformer or other electrical equipment. A second end 112 of the first section may be disposed opposite the first end 110 and may also be configured to receive an electrical connection. However, the second end 112 may include a second electrical interface that may also be configured to receive an interface plug that may be covered by a waterproof, or watertight, cap 114. In one or more embodiments, the interface plug may be an electrically insulated plug. The interface plug may be used to mechanically and electrically secure a male bushing or connecting plug in the first electrical interface.

Still referring to FIG. 1A, second section 104 may have an opening 116 at an end opposite the ending intersecting the first section 102. Opening 116 may be configured to receive an electrical cable. The second section 104 may also include a third electrical interface 118 that may be configured to make an electrical connection. For example, the third electrical interface 118 may be configured to receive a male bushing, a connecting plug, or any IEEE 600 A interface. The third electrical interface 118 may be oriented parallel to the first section and disposed adjacent to the second electrical interface. In one or more embodiments, the third electrical interface 118 may be a K600 access interface load receptacle. If the third electrical interface 118 is not being used for an electrical connection, the third electrical interface 118 may be covered with a watertight cap 120. Cap 120 may be identical to cap 114. Elbow connector 100 may be able to provide third electrical interface 118 with no additional footprint in two dimensions. As an example, if elbow connector 100 were oriented with opening 116 facing downward and axis 108 being oriented vertically, the third electrical interface 118 would not occupy any additional space in the horizontal plane from what the other components of the elbow connection 100 were already occupying. The third electrical interface 118 may extend a distance from an axis 108 of the second section 104 that is less than or equal to a distance from the axis 108 of the second section 104 that the second interface extends This feature may be useful in environments with limited space.

In one or more embodiments, an elbow connector 100 may have a capacitive test point 144 that may allow a user to determine whether the elbow connector is energized. The capacitive test point may be covered when not in use by a watertight cap 124. Further, the housing 126 of the elbow connector may include one or more forms of Ethylene Propylene Diene Monomer (EPDM) rubber.

Figure 1B:
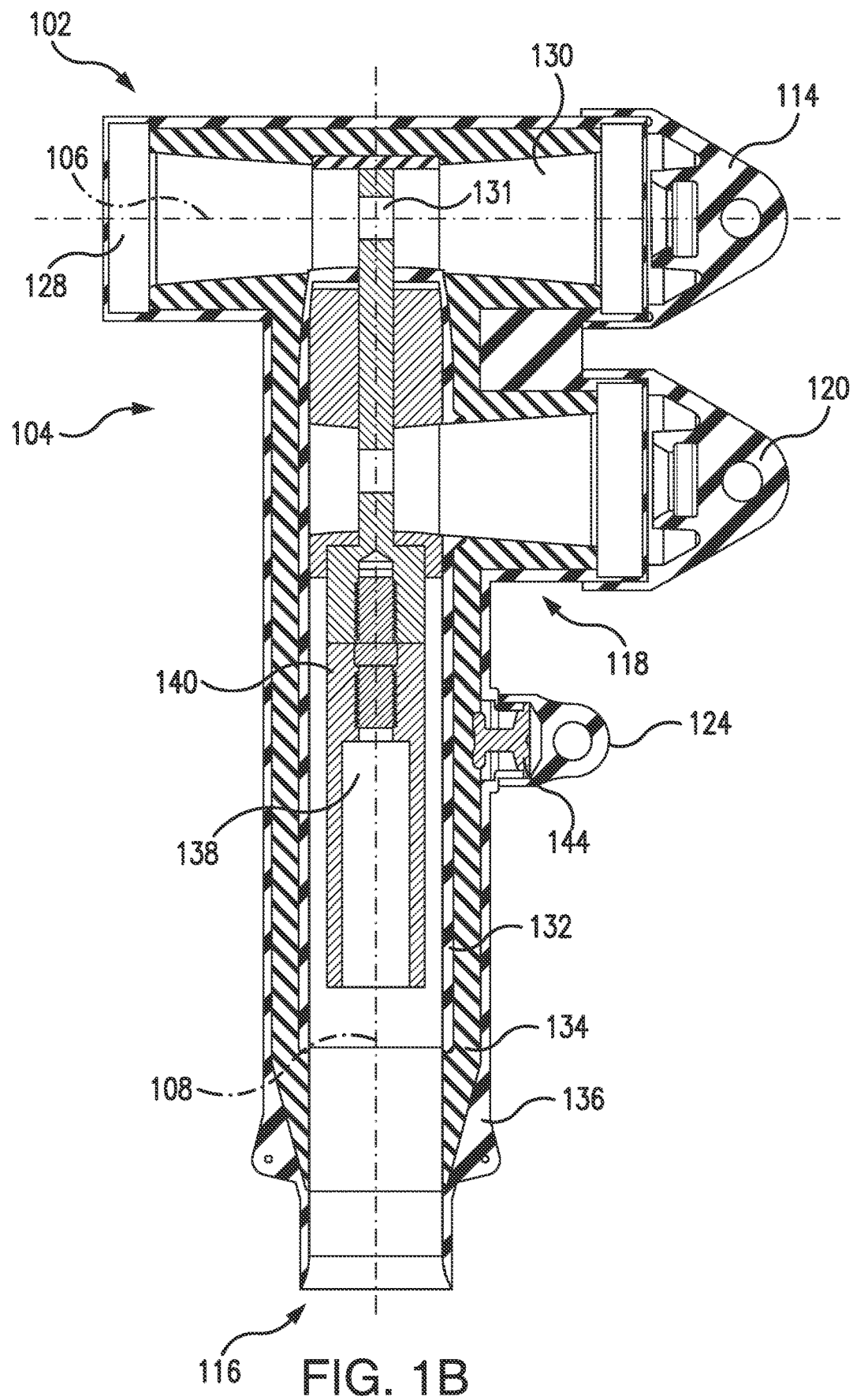

FIG. 1B provides a cross sectional view of elbow connector 100, showing many features identified in FIG. 1A. As presented in FIG. 1B, the left end of first section 102 may include an opening for receiving a male bushing in first electrical interface 128. Electrical interface 128 may be tapered, and such a taper may be according to an industry standard such as IEEE Standard 386. A second electrical interface 130 may also include a tapered bore. In one or more embodiments, each taper bore has identical dimensions. An interface plug may be placed in the second electrical interface 130 and pass a threaded lug through opening 131. The threaded lug may be used to engage with a male bushing or connecting plug to securely connect to electrical equipment such as a transformer.

The housing 126 of an elbow connector 100 may include a plurality of layers. For example, there may be a conductive inner layer 132, an insulating middle layer 134, and a conductive outer layer 136. The inner layer 132 and the outer layer 136 may include conductive EPDM rubber, while the middle layer 134 may include insulating EPDM rubber. Thus, middle layer 134 may electrically isolate inner layer 132 from outer layer 136.

An electrical cable may be received through opening 116 at one end of second section 104. The inner conductor of the cable may be inserted into cavity 138 of compression lug 140 and secured. The cable may be secured by crimping cavity 138 around the inner conductor using, for example, a pneumatic crimping tool. Other manners of securing may also be used, depending on the particular environment and circumstances of the installation and the needs and requirements of the user. The elbow connector, when connected to at least a cable and electrical equipment may be watertight, able to pass a submersion test.

Electrical interface 118 may also have a tapered bore. In one or more embodiments, electrical interfaces 128, 130, and 118 may have identical features, for example, features described by an industry standard. Electrical interface 118 is shown in FIG. 1B covered by cap 120. Thus, the second electrical interface 130 and the third electrical interface 118 may each be configured to be covered with a respective watertight cap that electrically insulates inside the housing from outside the housing.

Capacitive test point 144 is shown covered by cap 124.

Figure 1C:
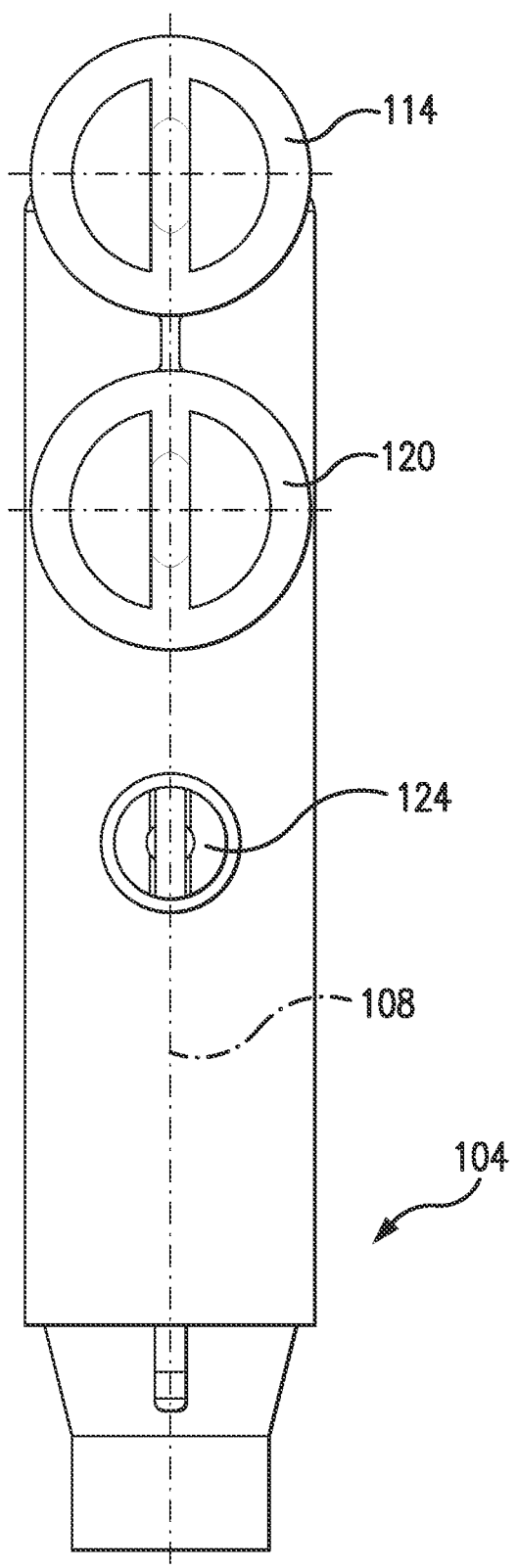
Figure 1D:
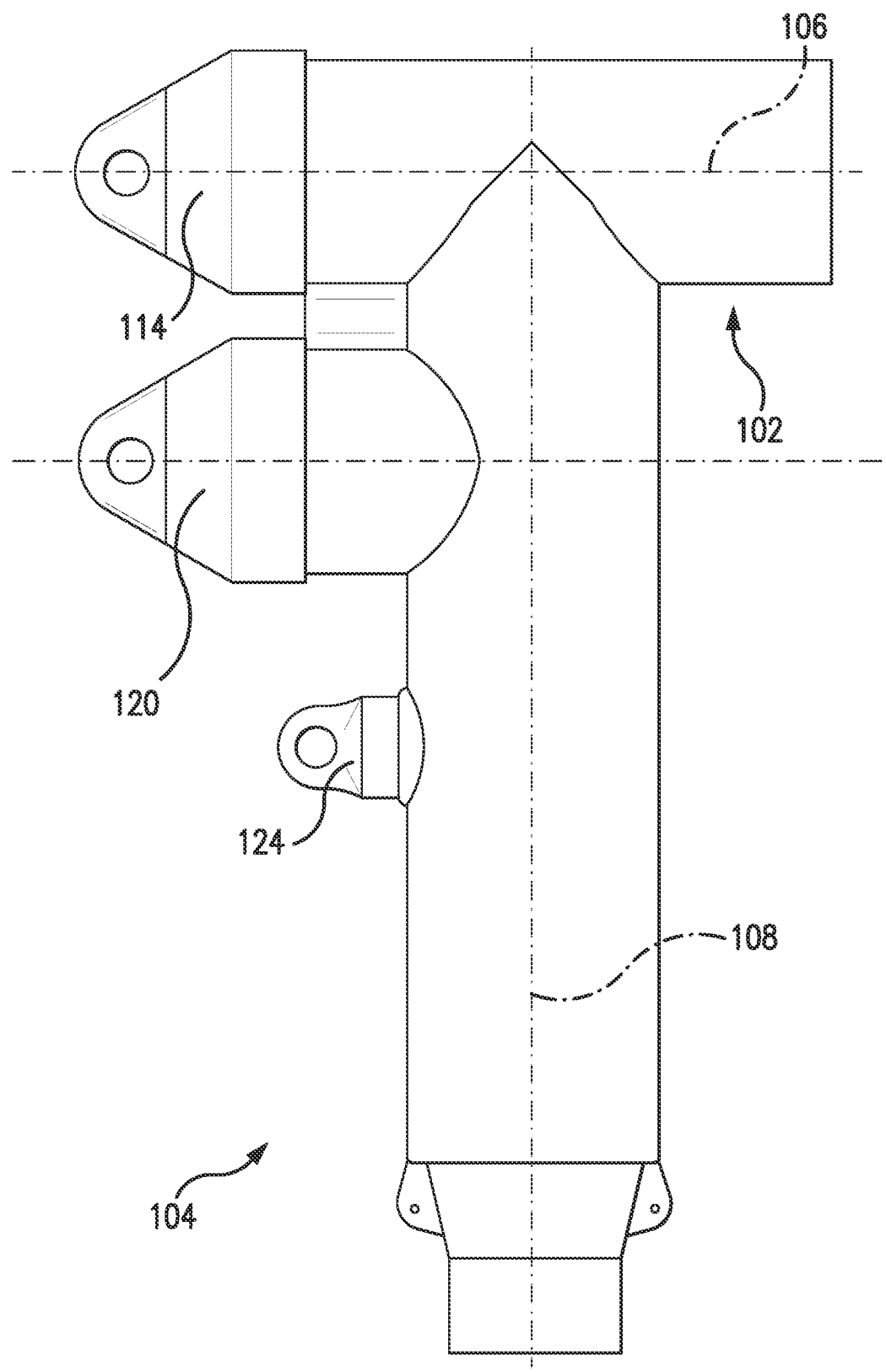

FIGS. 1C and 1D show features of elbow connector 100 previously described.

Figure 2A:
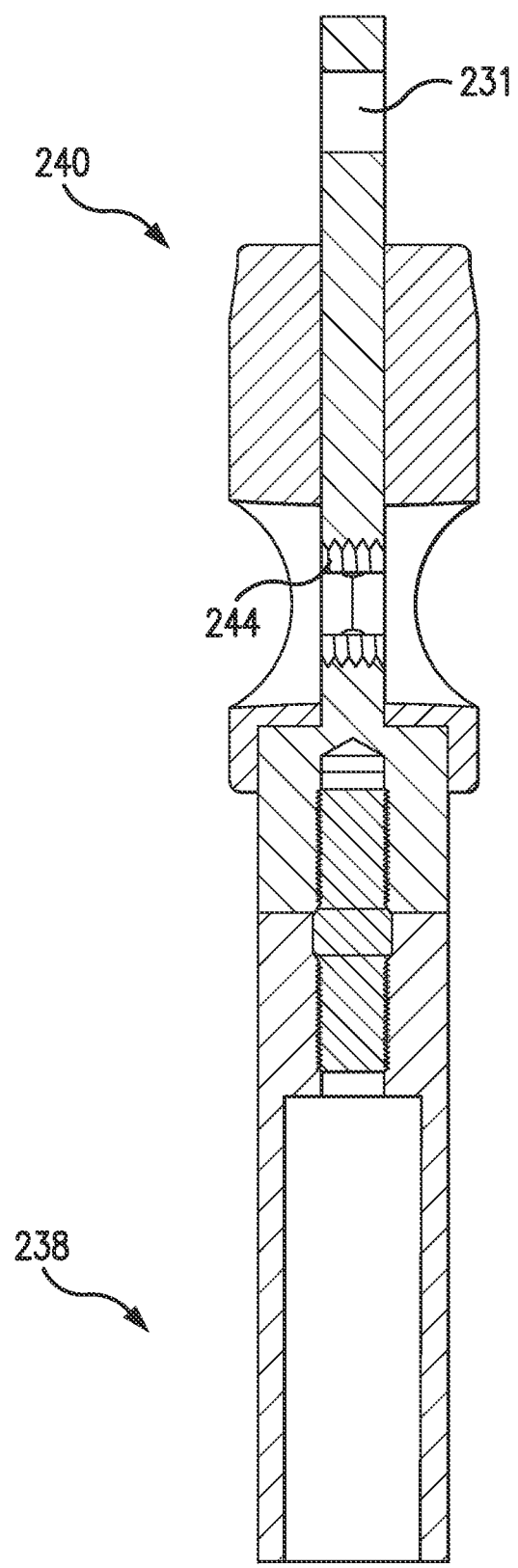
FIGS. 2A-2C show a cross sectional view, an end view, and a side view, respectively, of a compression lug in accordance with one or more embodiments.

Referring to FIG. 2A, a compression lug 240, 140 may be seen in cross section. As discussed above, a compression lug 240, 140 may be configured to receive and secure an electrical cable in cavity 238, 138. Securing may be accomplished by crimping cavity 238 around the cable or by other means such as soldering, screwing, and the like. Assembling an elbow connection may include inserting the electrical cable into crimping cavity 238, crimping the cavity, and then inserting compression lug 340, 140 into the housing 126 of the elbow connection.

Threaded opening 244 may be used to secure an interface plug with threaded end of the plug. Opening 231 is configured to be located between the first and second electrical interfaces of the first section and allows a threaded lug to pass through in order to secure a male bushing or a connecting plug for connection to electrical equipment.

Figure 2B:
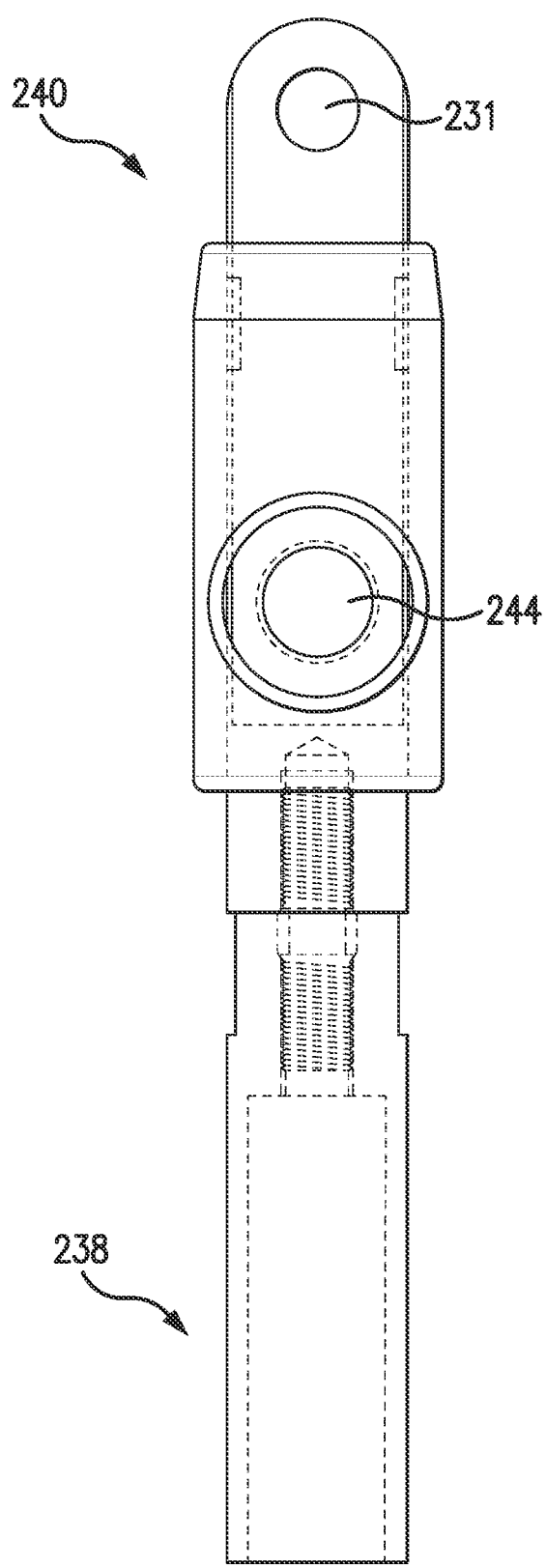
Figure 2C:
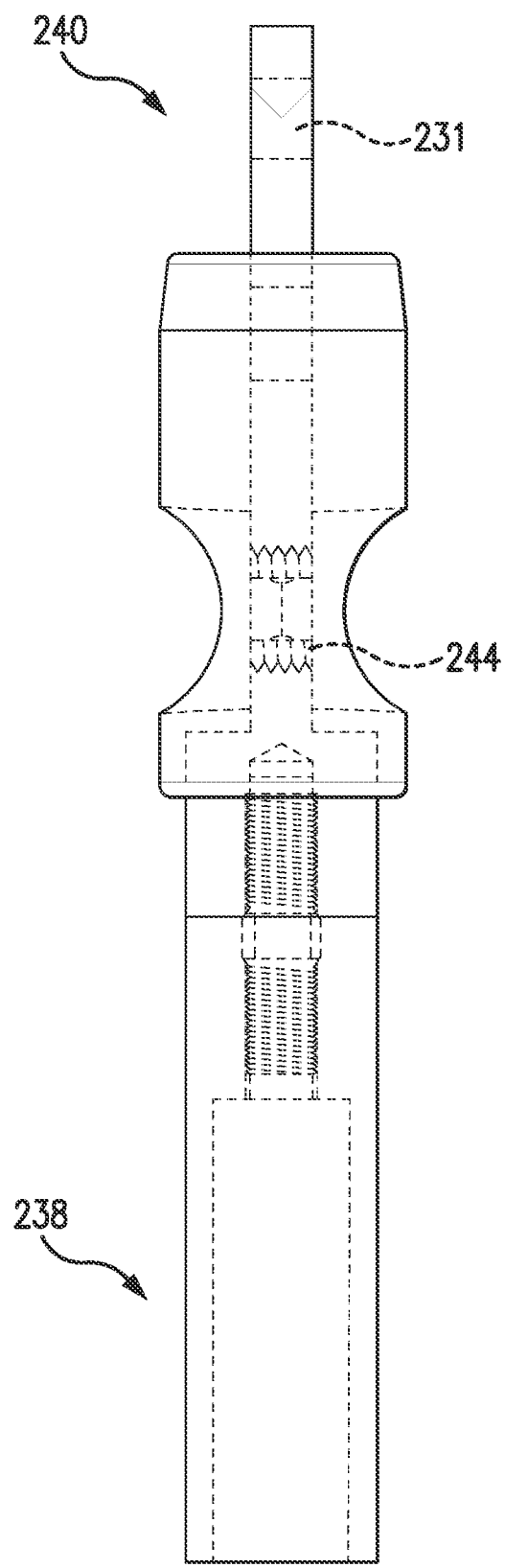

FIGS. 2B and 2C provide end and side views, respectively, of compression lug 240, 140.

Figure 3A:
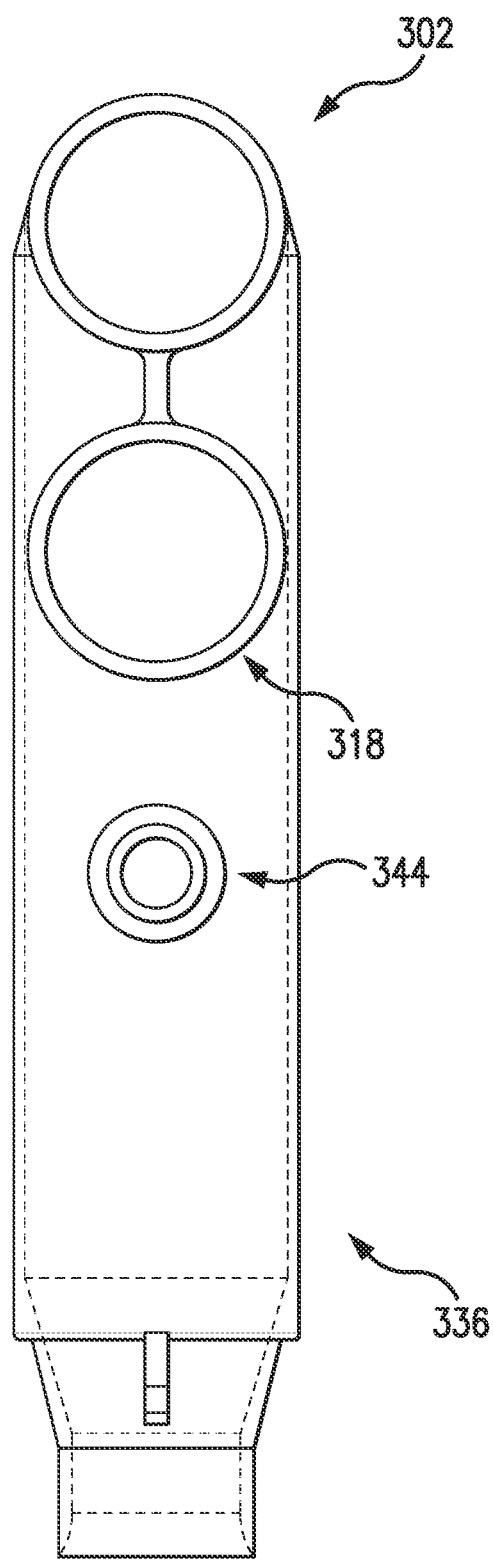
FIGS. 3A and 3B show end view and a side view, respectively, of an outer conductive jacket of an power distribution connector in accordance with one or more embodiments.
Figure 3B:
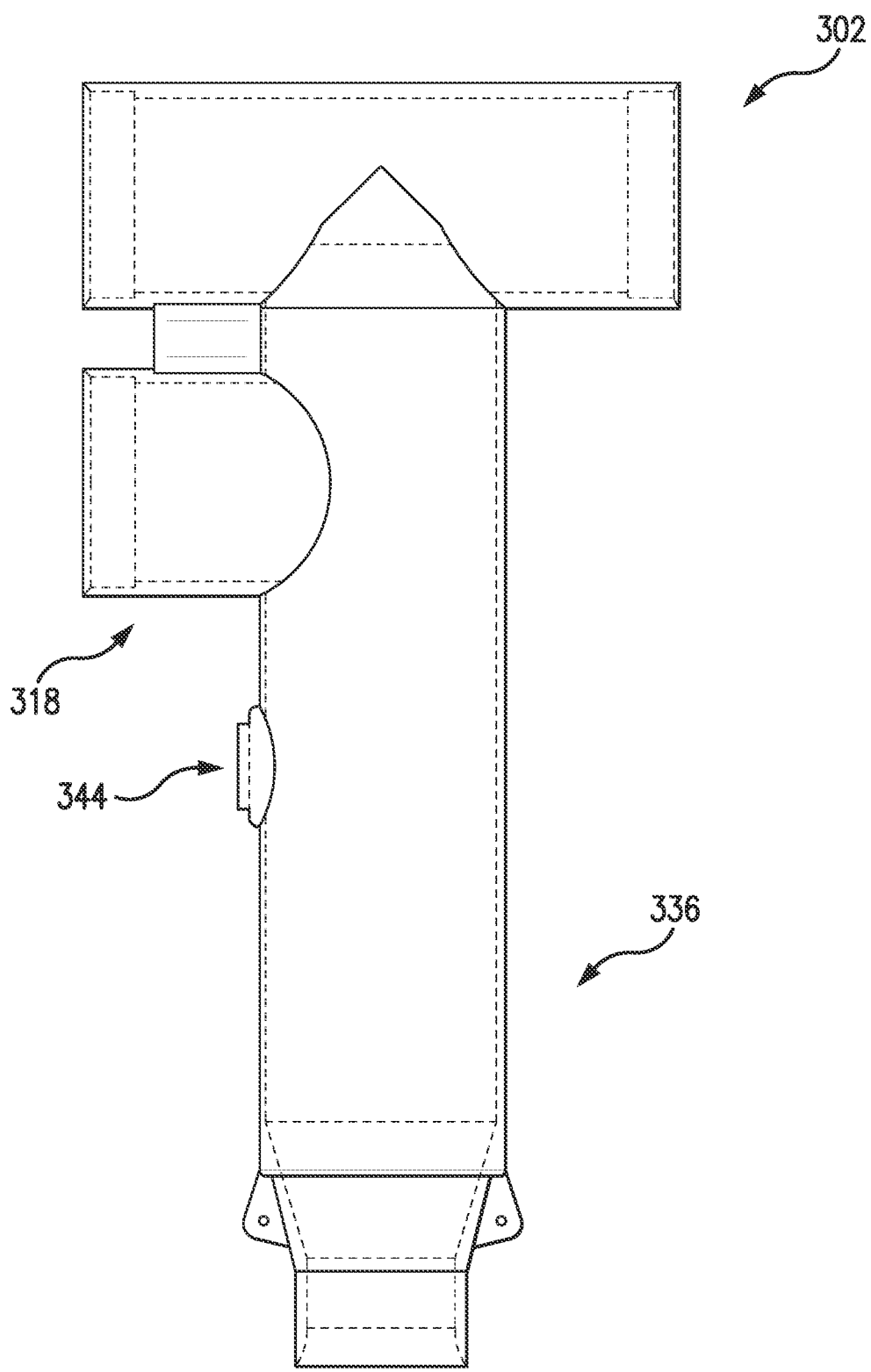

An outer conductive jacket (or layer) 336 of elbow connector 100 is shown in FIGS. 3A and 3B. FIG. 3A provides and end view, while FIG. 3B shows a side view of elbow connector 100. The figures show first section 302 and electrical interface 318. An opening 344 for a capacitive test point is also shown.

Figure 4A:
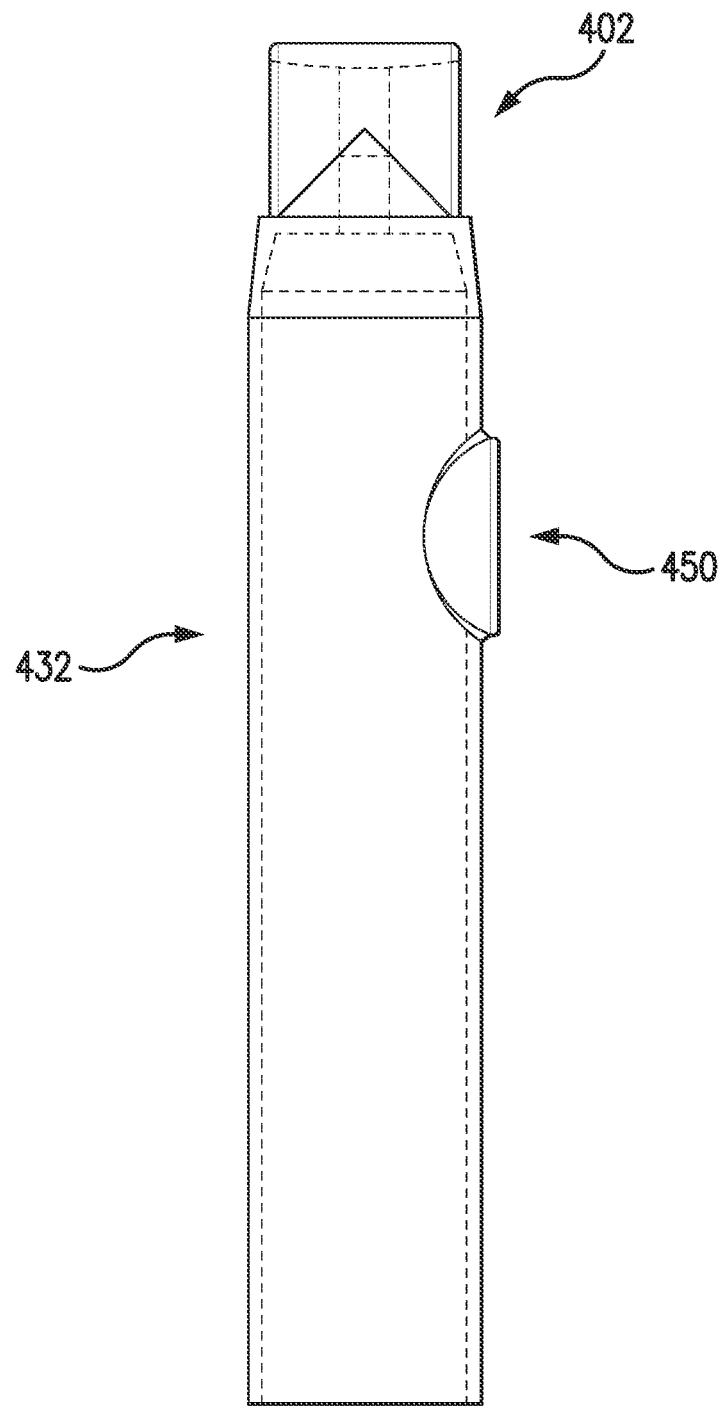
FIGS. 4A-4C show a side view, an end view, and a cross sectional view, respectively, of a conductive insert of a power distribution connector in accordance with one or more embodiments.
Figure 4B:
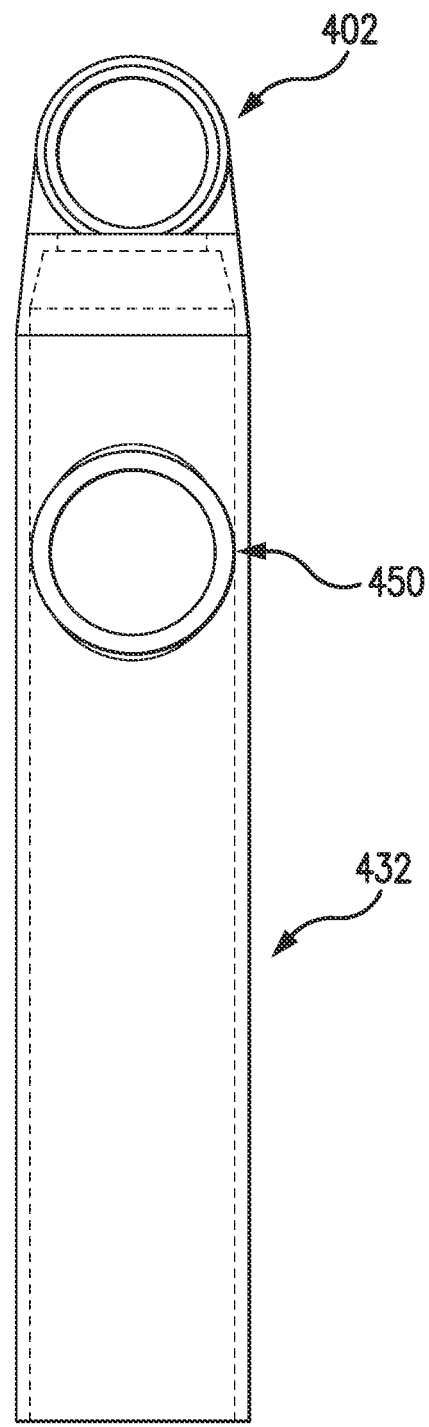
Figure 4C:
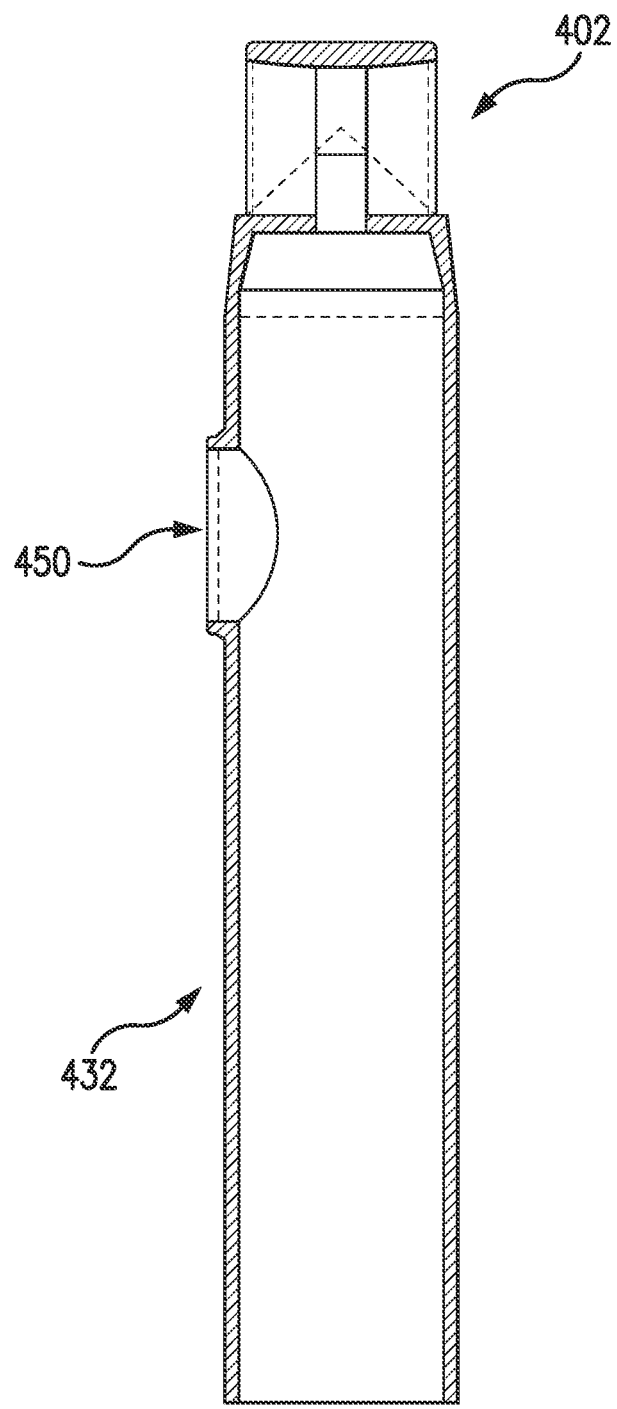

With reference to FIGS. 4A-4C, a side view, an end view, and a cross sectional view, respectively, of a conductive insert 432 (or conductive inner layer 132 of the housing of elbow connector 100) of an electrical elbow connector are presented. An opening 450 in the conductive insert 432 for electrical interface 118. In addition, the first section 402, 102 is seen in various views.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A power distribution connector configured to electrically connect an electrical cable to at least three electrical interfaces, the power distribution connector comprising:
   a housing, comprising:
      a first section, comprising:
         a first electrical interface comprising a first tapered bore and disposed at a first end of the first section, the first electrical interface configured to receive a first male bushing or first connecting plug, the first male bushing and the first connecting plug being electrically conductive; and
         a second electrical interface comprising a second tapered bore and disposed at a second end opposite the first end, the second electrical interface configured to receive an interface plug, wherein the interface plug mechanically and electrically secures the first male bushing or first connecting plug in the first tapered bore; and
      a second section that forms a T-shaped intersection with the first section between the first electrical interface and the second electrical interface, the second section comprising:
         a distal end opposite the T-shaped intersection, the distal end being configured to receive the electrical cable; and
         a third electrical interface comprising a third tapered bore and oriented parallel to the first section and disposed adjacent to the second electrical interface, the third electrical interface configured to receive and to electrically and mechanically secure a second male bushing and extending a distance from an axis of the second section that is less than or equal to a distance from the axis of the second section that the second electrical interface extends,
      wherein each tapered bore comprises identical dimensions.

2. The power distribution connector of claim 1, wherein the housing further comprises:
   an inner layer comprising a first conductive material;

an outer layer comprising a second conductive material; and a middle layer comprising an insulating material that is disposed between and electrically isolates the inner layer and the outer layer.

3. The power distribution connector of claim 2, wherein the first conductive material and the second conductive material comprise the same material.

4. The power distribution connector of claim 3, wherein:
the first and second conductive materials comprise conductive Ethylene Propylene Diene Monomer (EPDM) rubber; and
the insulating material comprises insulating EPDM rubber.

5. The power distribution connector of claim 1, wherein the power distribution connector is configured to carry at least a 600-ampere current.

6. The power distribution connector of claim 5, wherein the power distribution connector is configured to Standard 386 of the Institute of Electrical and Electronics Engineers (IEEE).

7. The power distribution connector of claim 1, wherein the second electrical interface and the third electrical interface are each configured to be covered with a respective watertight cap that electrically insulates inside the housing from outside the housing.

8. The power distribution connector of claim 1, wherein the interface plug comprises an electrically insulated plug.

9. The power distribution connector of claim 1, wherein the interface plug comprises a threaded stud configured to secure the first male bushing or first connecting plug in the first tapered bore.

10. The power distribution connector of claim 1, wherein the second section further comprises a capacitive test point.

11. The power distribution connector of claim 1, further comprising a conductive insert disposed within the second section and configured to receive and secure the electrical cable.

12. The power distribution connector of claim 11, wherein the conductive insert secures the electrical cable by crimping.

13. The power distribution connector of claim 1, wherein the power distribution connector is configured operate at voltages between 2.5 kV and 35 kV.

14. The power distribution connector of claim 13, wherein the power distribution connector is configured operate at voltages between 15 kV and 25 kV.

15. The power distribution connector of claim 13, wherein the power distribution connector is configured operate at 35 kV.

16. A 600-ampere power distribution connector configured to electrically connect an electrical cable to at least three electrical interfaces, the power distribution connector comprising:
a housing, comprising:
a first section, comprising:
a first electrical interface comprising a first tapered bore and disposed at a first end of the first section, the first electrical interface configured to receive a first 600-ampere male interface configured to Standard 386 of the Institute of Electrical and Electronics Engineers (IEEE), the first male interface being electrically conductive; and
a second electrical interface comprising a second tapered bore and disposed at a second end opposite the first end, the second electrical interface configured to receive an interface plug, wherein the interface plug mechanically and electrically secures the first male bushing or first connecting plug in the first tapered bore; and
a second section that forms a T-shaped intersection with the first section between the first electrical interface and the second electrical interface, the second section comprising:
a distal end opposite the T-shaped intersection, the distal end being configured to receive the electrical cable; and
a third electrical interface comprising a third tapered bore and oriented parallel to the first section and disposed adjacent to the second electrical interface, the third electrical interface configured to receive a second 600-ampere male interface configured to IEEE Standard 386 and to electrically and mechanically secure a second male bushing and extending a distance from an axis of the second section that is less than or equal to a distance from the axis of the second section that the second electrical interface extends,
wherein each electrical interface comprises identical dimensions, and wherein the housing further comprises:
an inner layer comprising a first conductive material;
an outer layer comprising a second conductive material; and
a middle layer comprising an insulating material that is disposed between and electrically isolates the inner layer and the outer layer.

17. The power distribution connector of claim 16, wherein:
the first and second conductive materials comprise conductive Ethylene Propylene Diene Monomer (EPDM) rubber, and
the insulating material comprises insulating EPDM rubber.

18. The power distribution connector of claim 16, wherein the second section further comprises a capacitive test point.

19. A K600 access interface load receptacle disposed in a 600-ampere deadbreak elbow connector, the connector comprising:
a housing, comprising:
a first section, comprising:
a first electrical interface comprising a first tapered bore and disposed at a first end of the first section, the first electrical interface configured to receive a first 600-ampere male interface configured to Standard 386 of the Institute of Electrical and Electronics Engineers (IEEE), the first male interface being electrically conductive; and
a second electrical interface comprising a second tapered bore and disposed at a second end opposite the first end, the second electrical interface configured to receive an interface plug, wherein the interface plug mechanically and electrically secures the first male bushing or first connecting plug in the first tapered bore; and
a second section that forms a T-shaped intersection with the first section between the first electrical interface and the second electrical interface, the second section comprising:
a distal end opposite the T-shaped intersection, the distal end being configured to receive the electrical cable; and
the K600 access interface load receptacle comprising a third tapered bore and oriented parallel to the first section and disposed adjacent to the second electrical interface, the K600 access interface load receptacle configured to receive a second 600-ampere male interface configured to IEEE Standard 386 and to electrically and mechanically secure a second male bushing and extending a distance from an axis of the second section that is less than or equal to a distance from the axis of the second section that the second electrical interface extends, wherein the first electrical interface, the second electrical interface, and the K600 access interface load receptacle, each comprise identical dimensions, and wherein the housing further comprises:
an inner layer comprising a first conductive material;
an outer layer comprising a second conductive material; and
a middle layer comprising an insulating material that is disposed between and electrically isolates the inner layer and the outer layer.

20. The K600 access interface load receptacle of claim 19, wherein:
the first and second conductive materials comprise conductive Ethylene Propylene Diene Monomer (EPDM) rubber, and
the insulating material comprises insulating EPDM rubber.

* * * * *